US012754632B2

(12) United States Patent
Lee et al.

(10) Patent No.: US 12,754,632 B2
(45) Date of Patent: Oct. 6, 2026

(54) ELECTRONIC DEVICE AND METHOD FOR PROCESSING TOUCH INPUT INCLUDING REFRESH RATE ADJUSTMENT

(71) Applicant: Samsung Electronics Co., Ltd., Suwon-si (KR)

(72) Inventors: Seoyoung Lee, Suwon-si (KR); Minwoo Lee, Suwon-si (KR); Kwangtai Kim, Suwon-si (KR); Donghyun Yeom, Suwon-si (KR); Seungryeol Kim, Suwon-si (KR); Juseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/925,619

(22) Filed: Oct. 24, 2024

(65) Prior Publication Data

US 2025/0053260 A1 Feb. 13, 2025

Related U.S. Application Data

(63) Continuation of application No. PCT/KR2023/003422, filed on Mar. 14, 2023.

(30) Foreign Application Priority Data

May 4, 2022 (KR) ........................ 10-2022-0055326
Jun. 3, 2022 (KR) ........................ 10-2022-0068271

(51) Int. Cl.
*G06F 3/041* (2006.01)
*G06F 3/0488* (2022.01)

(52) U.S. Cl.
CPC ........ *G06F 3/04166* (2019.05); *G06F 3/0488* (2013.01)

(58) Field of Classification Search
CPC .. G06F 3/04166; G06F 3/0488; G06F 1/3215; G06F 1/3262; G06F 1/3265;
(Continued)

(56) References Cited

U.S. PATENT DOCUMENTS 9,652,816 B1 5/2017 Holland et al.
9,696,846 B2 7/2017 Ma et al.
(Continued)

FOREIGN PATENT DOCUMENTS

CN 103217897 A 7/2013
KR 10-2015-0080582 A 7/2015
(Continued)

OTHER PUBLICATIONS

International Search Report dated Jun. 30, 2023, issued in International Patent Application No. PCT /KR2023/003422.
(Continued)

*Primary Examiner* — David D Davis
(74) *Attorney, Agent, or Firm* — Jefferson IP Law, LLP

(57) ABSTRACT

An electronic device is provided. The electronic device includes a touch screen, memory storing one or more computer programs, and one or more processors communicatively coupled to the touch screen, wherein the one or more computer programs include computer-executable instructions that, when executed by the one or more processors individually or collectively, cause the electronic device to display a screen based on a first refresh rate through the touch screen, while displaying the screen based on the first refresh rate, receive a signal indicating a reception of a touch input from the touch screen, before identifying a function to be executed based on the touch input, in response to the signal, control the touch screen to change a refresh rate of the touch screen from the first refresh rate to a second refresh rate higher than the first refresh rate, while the screen is
(Continued)

displayed based on the second refresh rate, identify the function based on a recognition of the touch input, based on identifying the function as corresponding to a predefined function, control the touch screen to change the refresh rate of the touch screen from the second refresh rate to a refresh rate different from the second refresh rate, and based on identifying the function as different from the predefined function, control the touch screen to maintain the refresh rate of the touch screen as the second refresh rate.

20 Claims, 10 Drawing Sheets

(58) Field of Classification Search
CPC ........ G06F 3/041; G06F 3/14; G06F 3/04184; G09G 3/2092; G09G 2340/0435; G09G 2354/00
See application file for complete search history.

(56) References Cited

U.S. PATENT DOCUMENTS

| | | | | |
|---|---|---|---|---|
| 10,133,403 | B2 | 11/2018 | Yeh et al. | |
| 10,275,070 | B2 | 4/2019 | Fu et al. | |
| 10,380,968 | B2 | 8/2019 | Zhang et al. | |
| 10,510,317 | B2 | 12/2019 | Spence et al. | |
| 10,802,646 | B2 | 10/2020 | Jeon et al. | |
| 10,991,345 | B2 | 4/2021 | Wood et al. | |
| 2014/0184518 | A1 | 7/2014 | Valavi | |
| 2015/0355774 | A1 | 12/2015 | Johansson et al. | |
| 2017/0371394 | A1* | 12/2017 | Chan | G06F 1/3218 |
| 2019/0034026 | A1 | 1/2019 | Yeh et al. | |
| 2020/0402478 | A1* | 12/2020 | Her | G09G 3/3648 |
| 2021/0225320 | A1* | 7/2021 | Sin | G09G 5/003 |
| 2021/0248957 | A1 | 8/2021 | Lee et al. | |
| 2021/0248973 | A1* | 8/2021 | Jeon | G09G 5/003 |
| 2021/0255721 | A1 | 8/2021 | Son et al. | |
| 2021/0335325 | A1 | 10/2021 | Her et al. | |
| 2022/0004244 | A1* | 1/2022 | Park | G06F 1/3262 |
| 2023/0020872 | A1 | 1/2023 | Lee et al. | |

FOREIGN PATENT DOCUMENTS

| | | | | | |
|---|---|---|---|---|---|
| KR | 10-2016-0139063 | A | | 12/2016 | |
| KR | 10-2018-0112073 | A | | 10/2018 | |
| KR | 10-2020-0121440 | A | | 10/2020 | |
| KR | 10-2020-0144827 | A | | 12/2020 | |
| KR | 10-2254884 | B1 | | 5/2021 | |
| KR | 20210078148 | A | * | 6/2021 | G06F 1/3231 |
| KR | 10-2419927 | B1 | | 7/2022 | |
| WO | 2018161578 | A1 | | 9/2018 | |
| WO | 2021/056364 | A1 | | 4/2021 | |
| WO | 2021/158074 | A1 | | 8/2021 | |

OTHER PUBLICATIONS

European Search Report dated Jun. 24, 2025, issued in European Application No. 23799558.4.
First Examination Report dated Dec. 19, 2025, issued in Indian Application No. 202417082230.

* cited by examiner

ELECTRONIC DEVICE AND METHOD FOR PROCESSING TOUCH INPUT INCLUDING REFRESH RATE ADJUSTMENT

CROSS-REFERENCE TO RELATED APPLICATION(S)

This application is a continuation application, claiming priority under § 365 (c), of an International application No. PCT/KR2023/003422, filed on Mar. 14, 2023, which is based on and claims the benefit of a Korean patent application number 10-2022-0055326, filed on May 4, 2022, in the Korean Intellectual Property Office, and of a Korean patent application number 10-2022-0068271, filed on Jun. 3, 2022, in the Korean Intellectual Property Office, the disclosure of each of which is incorporated by reference herein in its entirety.

BACKGROUND

1. Field

The disclosure relates to an electronic device and a method for processing a touch input.

2. Description of Related Art

An electronic device, such as a smartphone, a tablet personal computer (PC), a smart watch, or the like may display an image (or screen) based on a refresh rate through a touch screen. For example, the refresh rate may mean the number of times per second that the image refreshes on the touch screen.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for processing touch input.

Additional aspects will be set forth in part in the description which follows and, in part, will be apparent from the description, or may be learned by practice of the presented embodiments.

An electronic device is described. The electronic device may comprise a touch screen and a processor. The processor may be configured to display a screen based on a first refresh rate through the touch screen. The processor may be configured to, while displaying the screen based on the first refresh rate, receive a signal indicating a reception of a touch input from the touch screen. The processor may be configured to, before identifying a function to be executed based on the touch input, in response to the signal, control the touch screen to change a refresh rate of the touch screen from the first refresh rate to a second refresh rate higher than the first refresh rate. The processor may be configured to, while the screen is displayed based on the second refresh rate, identify the function based on a recognition of the touch input. The processor may be configured to control the touch screen to change the refresh rate of the touch screen that is the second refresh rate, based on identifying the function corresponding to a predefined function. The processor may be configured to control the touch screen to maintain the refresh rate of the touch screen that is the second refresh rate, based on identifying the function different from the predefined function.

A method for operating an electronic device including a touch screen is described. The method may comprise displaying a screen based on a first refresh rate through the touch screen. The method may comprise, while displaying the screen based on the first refresh rate, receiving a signal indicating a reception of a touch input from the touch screen. The method may comprise, before identifying a function to be executed based on the touch input, in response to the signal, controlling the touch screen to change a refresh rate of the touch screen from the first refresh rate to a second refresh rate higher than the first refresh rate. The method may comprise, while the screen is displayed based on the second refresh rate, identifying the function based on a recognition of the touch input. The method may comprise, based on identifying the function corresponding to a predefined function, controlling the touch screen to change the refresh rate of the touch screen that is the second refresh rate. The method may comprise, based on identifying the function different from the predefined function, controlling the touch screen to maintain the refresh rate of the touch screen that is the second refresh rate.

In accordance with another aspect of the disclosure, a non-transitory computer-readable storage media storing one or more programs is provided. The one or more programs include computer executable instructions that, when executed by an electronic device with a touch screen, cause the electronic device to, while displaying a screen based on a first refresh rate, receive a signal indicating a reception of a touch input from the touch screen. The one or more programs include computer executable instructions that, when executed by the electronic device, cause the electronic device to, before identifying a function to be executed based on the touch input, in response to the signal, control the touch screen to change a refresh rate of the touch screen from the first refresh rate to a second refresh rate higher than the first refresh rate. The one or more programs include computer executable instructions that, when executed by the electronic device, cause the electronic device to, while the screen is displayed based on the second refresh rate, identify the function based on a recognition of the touch input, based on identifying the function corresponding to a predefined function. The one or more programs include computer executable instructions that, when executed by the electronic device, cause the electronic device to, based on identifying the function corresponding to a predefined function, control the touch screen to change the refresh rate of the touch screen that is the second refresh rate. The one or more programs include computer executable instructions that, when executed by the electronic device, cause the electronic device to, based on identifying the function different from the predefined function, control the touch screen to maintain the refresh rate of the touch screen that is the second refresh rate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
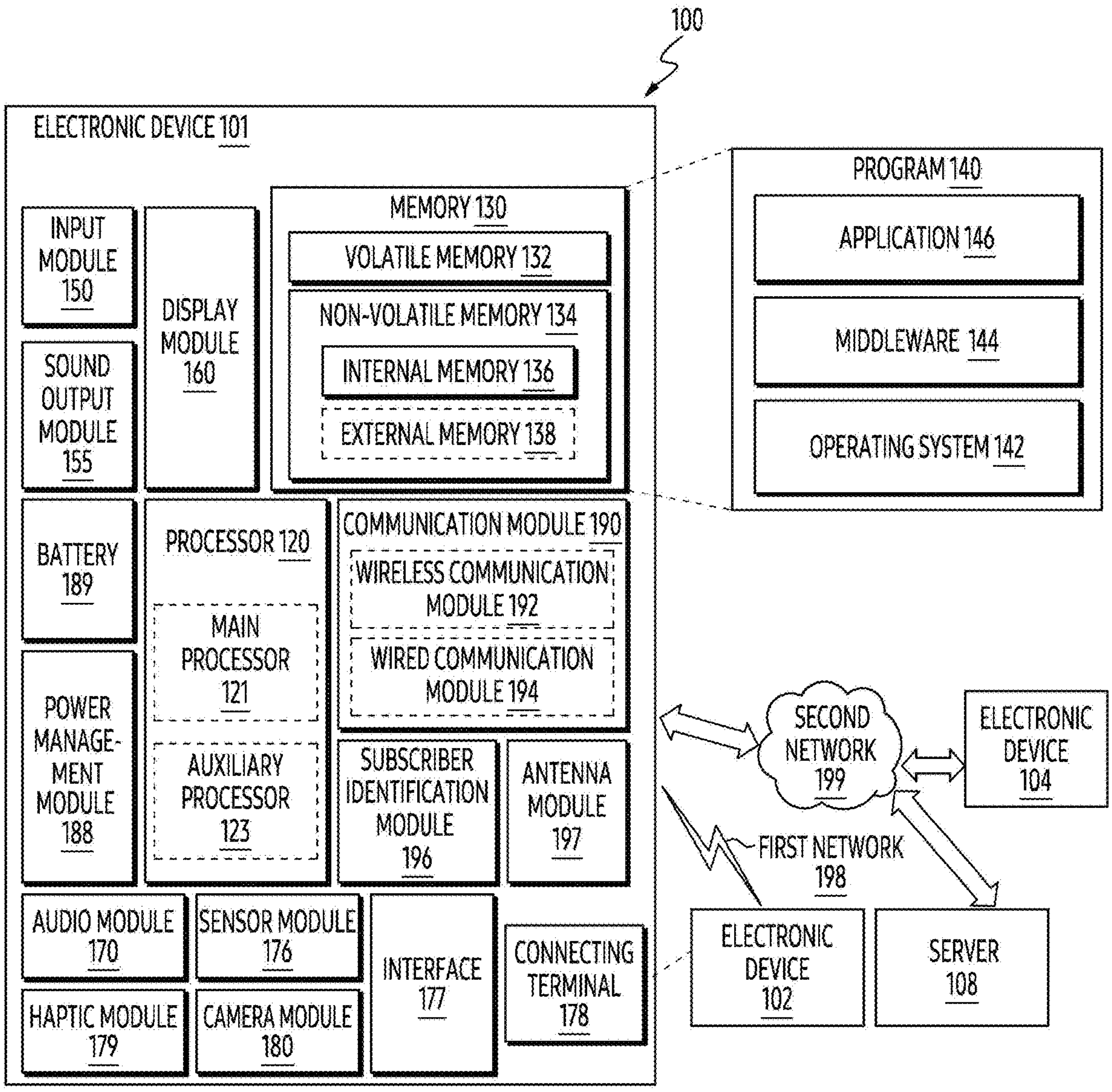
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
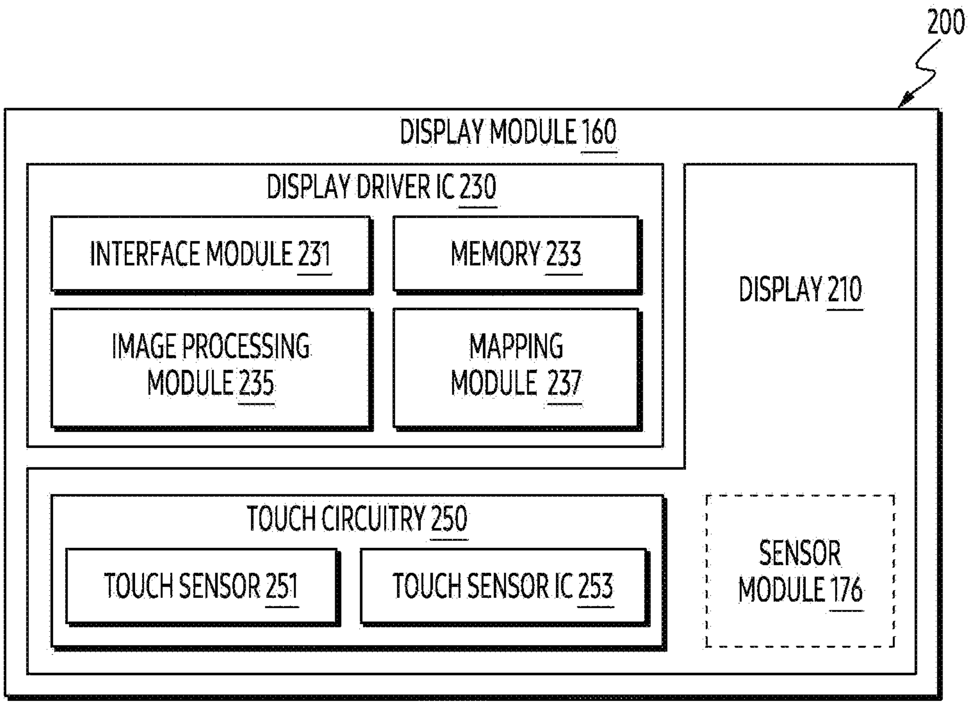
FIG. 2 is a block diagram of a display module according to an embodiment of the disclosure.

FIG. 2 is a block diagram 200 illustrating a display module according to an embodiment of the disclosure.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment of the disclosure, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment of the disclosure, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment of the disclosure, the display module 160 may further include the touch circuitry 250. The touch circuitry 250 may include a touch sensor 251 and a touch sensor IC 253 to control the touch sensor 251. The touch sensor IC 253 may control the touch sensor 251 to detect a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment of the disclosure, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment of the disclosure, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment of the disclosure, the touch sensor 251 or the sensor module 176 may be disposed between pixels in a pixel layer of the display 210, or over or under the pixel layer.

A touch screen of an electronic device may support a variable refresh rate. For example, on a condition that a state of the electronic device is changed from a state that reduces power consumption by the touch screen to a state that enhances quality of a screen displayed through the touch screen, the electronic device may change a refresh rate of the touch screen from a first refresh rate to a second refresh rate higher than the first refresh rate. For example, a method for reducing a time consumed to change the first refresh rate to the second refresh rate may be required.

Figure 3:
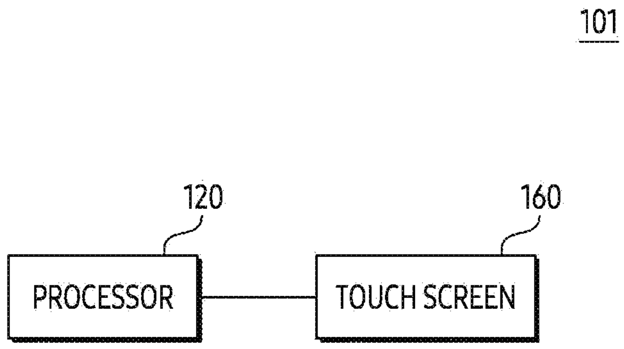
FIG. 3 illustrates components of an electronic device according to an embodiment of the disclosure.

FIG. 3 illustrates components of an electronic device according to an embodiment of the disclosure.

Referring to FIG. 3, an electronic device 101 may include a processor 120 and a touch screen (e.g., the display module 160). For example, the processor 120 may include the processor 120 illustrated in FIG. 1. For example, the touch screen 160 may include the display module 160 illustrated in FIG. 1, the display module 160 illustrated in FIG. 2, or the display 210 illustrated in FIG. 2. For example, the touch screen 160 may be operably (or operatively) coupled with the processor 120. For example, the touch screen 160 being operably coupled with the processor 120 may mean that the touch screen 160 is directly connected to the processor 120 in order for the processor 120 to control an operation of the touch screen 160, or that the touch screen 160 is connected to the processor 120 through another component of the electronic device 101 in order to control the operation of the touch screen 160.

In an embodiment of the disclosure, the processor 120 may display a screen through the touch screen 160 based on a refresh rate among a plurality of refresh rates. For example, the processor 120 may display a screen through the touch screen 160 based on a first refresh rate among the plurality of refresh rates, and a screen through the touch screen 160 based on a second refresh rate higher than the first refresh rate among the plurality of refresh rates. For example, the first refresh rate and the second refresh rate may be exemplified through a description of FIG. 4.

Figure 4:
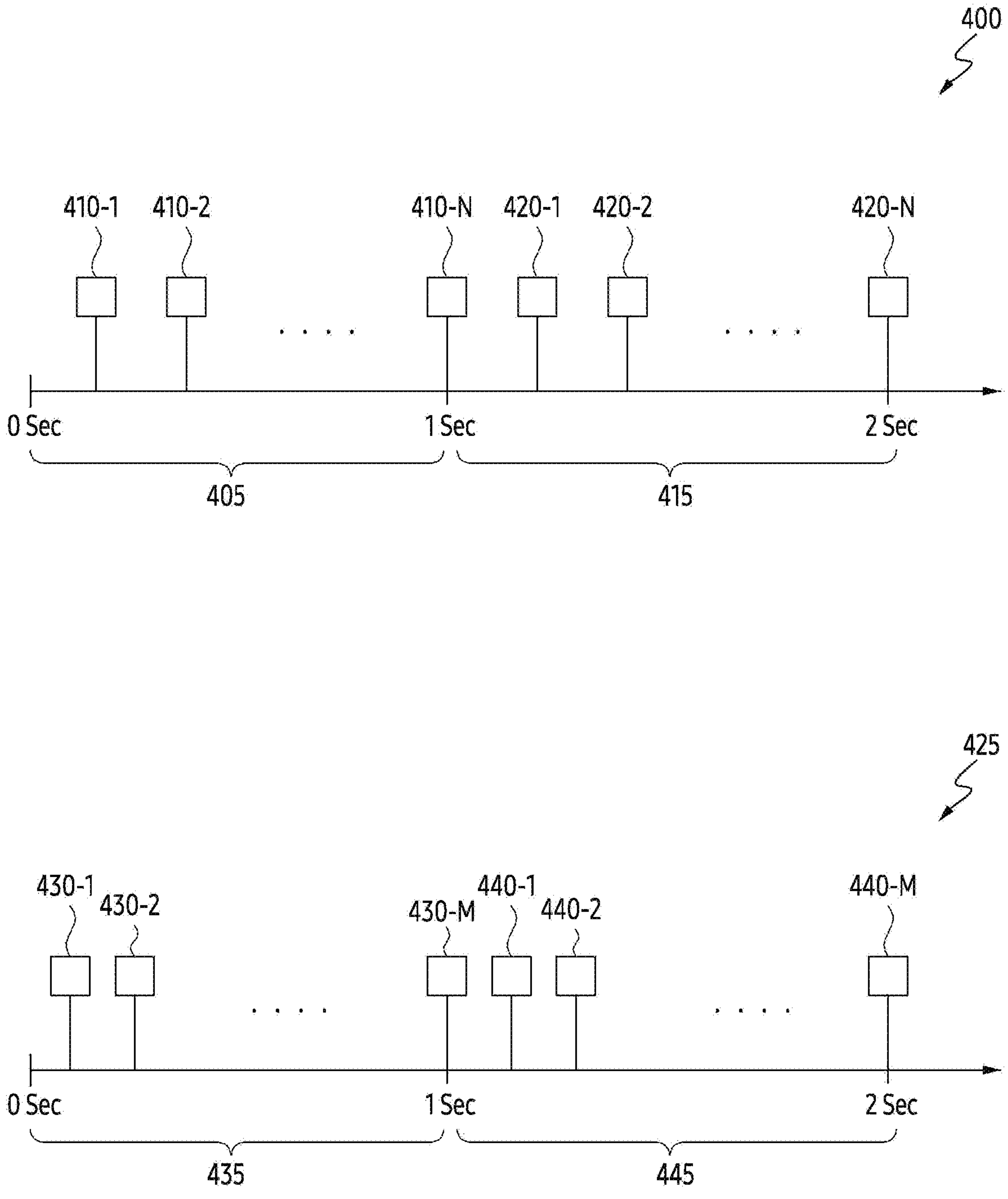
FIG. 4 illustrates refresh rates of a touch screen of an electronic device according to an embodiment of the disclosure.

FIG. 4 illustrates refresh rates of a touch screen of an electronic device according to an embodiment of the disclosure.

Referring to FIG. 4, a processor 120 may display a screen based on the first refresh rate. For example, as shown in a chart 400, the processor 120 may display a screen based on the first refresh rate by sequentially displaying a first image 410-1 to a Nth image 410-N (herein, N is a natural number greater than 1) through the touch screen 160 within a time period 405. For example, the processor 120 may display a screen based on the first refresh rate by sequentially displaying a first image 420-1 to a Nth image 420-N through the touch screen 160 within a time period 415 following the time period 405. For example, when the first refresh rate is 60 hertz (Hz), N may be 60. However, it is not limited thereto.

For example, the processor 120 may display a screen based on the second refresh rate. For example, as shown in a chart 425, the processor 120 may display a screen based on the second refresh rate by sequentially displaying a first image 430-1 to a $M^{th}$ image 430-M (herein, M is a natural number greater than N) through the touch screen 160 within a time period 435. For example, the processor 120 may display a screen based on the second refresh rate by sequentially displaying a first image 440-1 to a $M^{th}$ image 440-M through the touch screen 160 within a time period 445 following the time period 435. For example, when the second refresh rate is 120 Hz, M may be 120. However, it is not limited thereto.

Referring back to FIG. 3, power consumed to display a screen based on the first refresh rate may be less than power consumed to display the screen based on the second refresh rate, while quality of the screen displayed based on the first refresh rate may be less than quality of the screen displayed based on the second refresh rate.

In an embodiment of the disclosure, the processor 120 may display the screen based on the first refresh rate, based on identifying a first state where reducing power consumption by displaying the screen is prioritized over enhancing screen quality. For example, on a condition that a second state, which will be illustrated below, is changed to the first state, the processor 120 may change a refresh rate of the touch screen 160 from the second refresh rate to the first refresh rate. For example, the processor 120 may change the refresh rate of the touch screen 160 from the second refresh rate to the first refresh rate, based on identifying that a static image is displayed through the touch screen 160 for more than a certain time or no touch input is received. For example, the processor 120 may change the refresh rate of the touch screen 160 from the second refresh rate to the first refresh rate, based on identifying that frame data is not provided to the touch screen 160 from the processor 120 during a reference time. For example, the processor 120 may change the refresh rate of the touch screen 160 from the second refresh rate to the first refresh rate, based on identifying that a touch input is not received during a reference time. However, it is not limited thereto.

In an embodiment of the disclosure, the processor 120 may display the screen based on the second refresh rate, based on identifying a second state where enhancing screen quality is prioritized over reducing power consumption by displaying the screen. For example, on a condition that the first state is changed to the second state, the processor 120 may change a refresh rate of the touch screen 160 from the first refresh rate to the second refresh rate. For example, the processor 120 may change the refresh rate of the touch screen 160 from the first refresh rate to the second refresh rate, based on identifying an event displaying a dynamic image within the first state or receiving a touch input within the first state. However, it is not limited thereto.

In an embodiment of the disclosure, the processor 120 may receive a signal indicating a reception of a touch input from the touch screen 160 while displaying a screen through the touch screen 160 based on the first refresh rate.

For example, the touch input may include a user input having a point of contact on a screen displayed through the touch screen 160 based on the first refresh rate. For example, the touch input may be caused by an input means (e.g., a user's finger or a stylus pen) spaced apart within a certain distance from the screen displayed through the touch screen 160 based on the first refresh rate and may be identified by the touch screen 160. For example, the touch input may include a direct touch input caused by the input means in contact with the touch screen 160 and/or a hovering input caused by the input means spaced apart from the touch screen 160. However, it is not limited thereto.

For example, the signal indicating the reception of the touch input may be a signal encoded through a firmware for the touch screen 160. For example, the signal indicating the reception of the touch input may be generated (or obtained) through the touch screen 160 and provided from the touch screen 160 to the processor 120. For example, the signal indicating the reception of the touch input may include information regarding the touch input. For example, the information may include data indicating a location within the touch screen 160 where the touch input is caused. However, it is not limited thereto.

In an embodiment of the disclosure, the processor 120 may control the touch screen 160 to change the refresh rate of the touch screen 160 from the first refresh rate to the second refresh rate in response to the signal before identifying a function to be executed based on the touch input. For example, the function may correspond to the user's intention causing the touch input. For example, the function may be one of functions available through a screen displayed based on the first refresh rate while the touch input is received. For example, the function may be exemplified through a description of FIG. 5.

Figure 5:
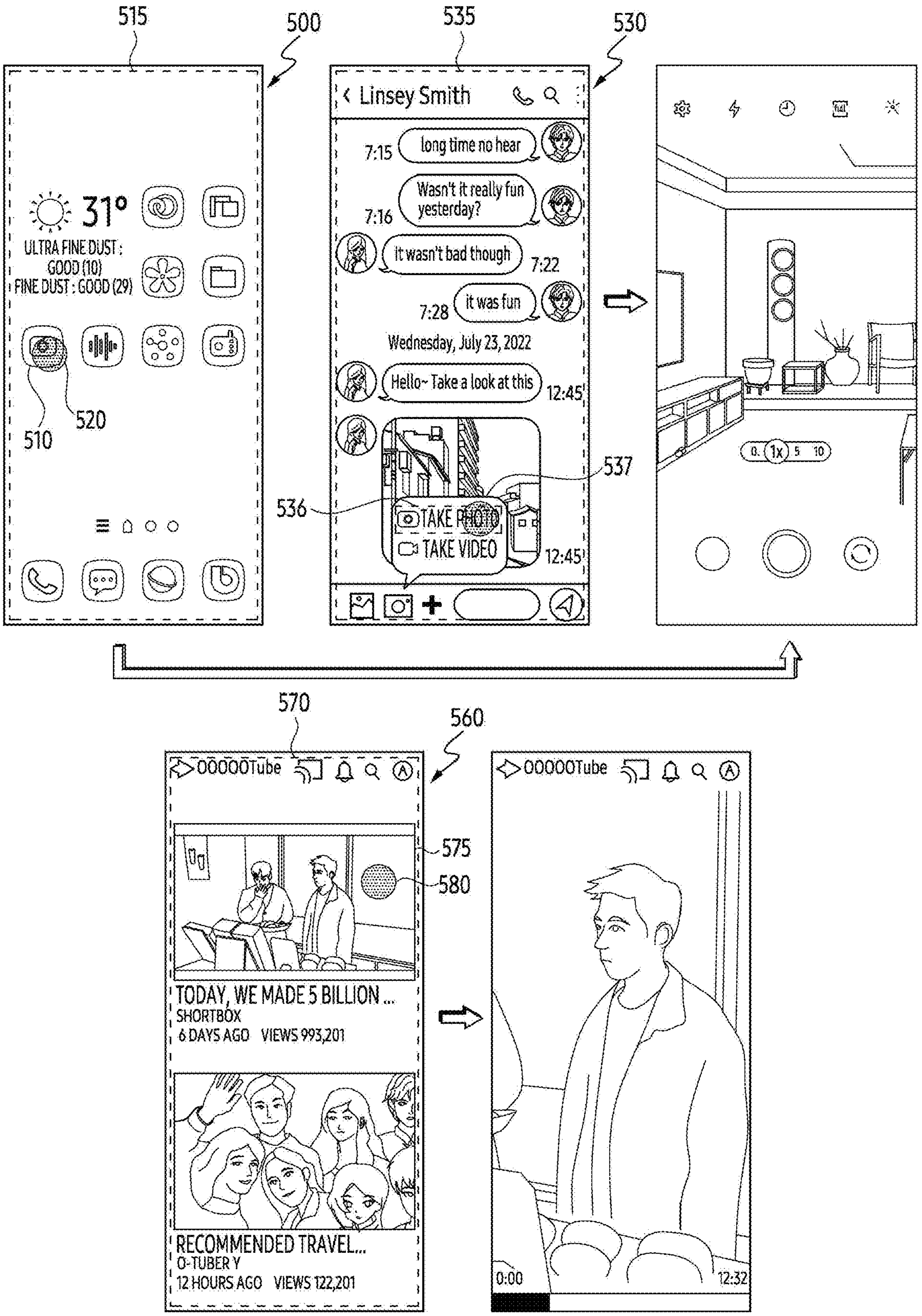
FIG. 5 illustrates a touch input received while displaying a screen based on a first refresh rate according to an embodiment of the disclosure.

FIG. 5 illustrates a touch input received while displaying a screen based on a first refresh rate according to an embodiment of the disclosure.

Referring to FIG. 5, as shown in a situation 500, the function may include a function of newly executing a software application installed in the electronic device 101 and/or a function of changing an execution state of the software application from a background state to a foreground state. For example, while a screen 515 (e.g., wallpaper) including an executable object 510 is displayed based on the first refresh rate, the processor 120 may receive, from the touch screen 160, the signal indicating a reception of a touch input 520 for executing the software application, which has a point of contact on the executable object 510 and is indicated by the executable object 510.

For example, the function may include a function provided through a user interface of a software application installed in the electronic device 101, as shown in a situation 530 or a situation 560. For example, while a screen 535 including a user interface of a software application is displayed based on the first refresh rate, the processor 120 may receive, from the touch screen 160, the signal indicating a reception of a touch input 537 for executing a function (e.g., obtaining a static image) having a point of contact on a visual object 536 within the user interface and indicated by the visual object 536. For example, while a screen 570 including a user interface of a software application is displayed based on the first refresh rate, the processor 120 may receive, from the touch screen 160, the signal indicating a reception of a touch input 580 for executing a function (e.g., a reproduction of a video including an image corresponding to a thumbnail image represented by a visual object 575), which has a point of contact on the visual object 575 in the user interface within the screen 570 and is indicated by the visual object 575.

Referring back to FIG. 3, the refresh rate of the touch screen 160 being changed from the first refresh rate to the second refresh rate before the function is identified may mean that the processor 120 changes the refresh rate to the second refresh rate within a state of obtaining the signal from the touch screen 160 without identifying the function based on the signal. For example, the refresh rate of the touch screen 160 being changed from the first refresh rate to the second refresh rate before the function is identified may mean that the processor 120 changes the refresh rate to the second refresh rate within a state of obtaining the signal from the touch screen 160 without identifying the user's intention causing the touch input based on the signal. For example, the processor 120 may enhance the quality of the screen displayed through the touch screen 160 in a faster response than changing the refresh rate of the touch screen 160 to the second refresh rate after identifying the function, by changing the refresh rate of the touch screen 160 to the second refresh rate before identifying the function. For example, in order to display a higher quality screen with a faster response, the processor 120 may change the refresh rate of the touch screen 160 to the second refresh rate before a recognition of the touch input is completed. For example, the processor 120 may change the refresh rate of the touch screen 160 to the second refresh rate, before a touch event for the touch input is obtained based on the signal indicating the reception of the touch input or before the touch event is decoded. For example, referring to FIG. 5, the processor 120 may change the refresh rate of the touch screen 160 to the second refresh rate, before identifying or recognizing that the touch input 520 is associated with the executable object 510. For example, the processor 120 may change the refresh rate of the touch screen 160 to the second refresh rate, before identifying or recognizing that the touch input 520 is an input for executing a software application indicated by the executable object 510. For example, the processor 120 may change the refresh rate of the touch screen 160 to the second refresh rate, before identifying or recognizing that the touch input 520 is an input for changing the execution state of the software application indicated by the executable object 510 to the foreground state. However, it is not limited thereto.

For example, the processor 120 may change the refresh rate of the touch screen 160 to the second refresh rate, before identifying or recognizing that the touch input 537 is associated with the visual object 536. For example, the processor 120 may change the refresh rate of the touch screen 160 to the second refresh rate, before identifying or recognizing that the touch input 537 is an input for executing obtaining of a static image that is a function indicated by the visual object 536. However, it is not limited thereto.

For example, the processor 120 may change the refresh rate of the touch screen 160 to the second refresh rate, before identifying or recognizing that the touch input 580 is associated with the visual object 575. For example, the processor 120 may change the refresh rate of the touch screen 160 to the second refresh rate, before identifying or recognizing that the touch input 580 is an input for reproducing a video including an image corresponding to a thumbnail image represented by the visual object 575. However, it is not limited thereto.

Referring back to FIG. 3, in an embodiment of the disclosure, the processor 120 may identify the function based on a recognition of the touch input while a screen is displayed based on the second refresh rate changed from the first refresh rate. For example, the processor 120 may identify the function based on decoding the touch event identified based on the signal indicating the reception of the touch input while the screen is displayed based on the second refresh rate. For example, the processor 120 may identify the function by recognizing the touch input in order to provide a response to the touch input while the screen is displayed based on the second refresh rate.

For example, the processor 120 may identify the function corresponding to a predefined function or the function not corresponding to the predefined function, while displaying the screen based on the second refresh rate. For example, the predefined function may be defined within the electronic device 101 in order to identify whether displaying a screen based on the second refresh rate corresponds to executing the function according to the touch input. For example, the predefined function may be defined within the electronic device 101 in order to identify a suitable function for displaying a screen based on another refresh rate different from the second refresh rate than displaying a screen based on the second refresh rate.

For example, since changing the refresh rate of the touch screen 160 to the second refresh rate is executed before identifying the function corresponding to the touch input, the processor 120 may identify whether the function corresponds to the predefined function.

For example, the function corresponding to the predefined function may mean that changing the refresh rate of the touch screen 160 that is the second refresh rate is more suitable than maintaining the refresh rate of the touch screen 160 that is the second refresh rate. For example, the function corresponding to the predefined function may mean that displaying a screen displayed according to the execution of the function based on another refresh rate different from the second refresh rate is suitable than displaying the screen displayed according to the execution of the function based on the second refresh rate. However, it is not limited thereto.

For example, the fact that the function does not correspond to the predefined function or the function is different from the predefined function may mean that maintaining the refresh rate of the touch screen 160 that is the second refresh rate is suitable than changing the refresh rate of the touch screen 160 that is the second refresh rate. For example, the fact that the function does not correspond to the predefined function or that the function is different from the predefined function may mean that displaying the screen displayed according to the execution of the function based on the second refresh rate is suitable than displaying the screen displayed according to the execution of the function based on another refresh rate different from the second refresh rate. However, it is not limited thereto.

For example, the function corresponding to the predefined function may be a function associated with a software application that provides a service based on a frame per second (FPS) not corresponding to the second refresh rate. For example, the function corresponding to the predefined function may be a function associated with a software application pre-registered to display a screen based on a refresh rate different from the second refresh rate, among a plurality of software applications installed in the electronic device 101. For example, executing the function corresponding to the predefined function may be more suitable to displaying a screen based on another refresh rate different from the second refresh rate in the second state than displaying a screen based on the second refresh rate in the second state. However, it is not limited thereto.

In an embodiment of the disclosure, the processor 120 may control the touch screen 160 to change the refresh rate of the touch screen 160 from the second refresh rate to another refresh rate, based on identifying the function corresponding to the predefined function. For example, the processor 120 may change the second refresh rate to the other refresh rate, by transmitting or providing to the touch screen 160 a signal (or command) for changing a period of a vertical synchronization signal of the touch screen 160 based on identifying the function corresponding to the predefined function. For example, the other refresh rate may be a refresh rate corresponding to the function. For example, the other refresh rate may be the first refresh rate. The other refresh rate may be a third refresh rate different from the first refresh rate and the second refresh rate. The third refresh rate may be lower than the first refresh rate. The third refresh rate may be higher than the second refresh rate. The third refresh rate may be between the first refresh rate and the second refresh rate.

For example, referring to FIG. 5, based on identifying that the touch input 520 is an input for executing a software application associated with a camera (e.g., the camera module 180 of FIG. 1) of the electronic device 101, the processor 120 may control the touch screen 160 to change the refresh rate of the touch screen 160 from the second refresh rate to the other refresh rate corresponding to FPS of the camera.

For example, based on identifying that the touch input 537 is an input for activating the camera, the processor 120 may control the touch screen 160 to change the refresh rate of the touch screen 160 from the second refresh rate to the other refresh rate corresponding to the FPS of the camera.

For example, based on identifying that touch input 580 is an input for reproducing a video having FPS different from the second refresh rate, the processor 120 may control the touch screen 160 to change the refresh rate of the touch screen 160 from the second refresh rate to the other refresh rate corresponding to the FPS of the video.

Referring back to FIG. 3, in an embodiment of the disclosure, the processor 120 may control the touch screen 160 to maintain the refresh rate of the touch screen 160 as the second refresh rate based on identifying the function different from the predefined function. For example, since the function not corresponding to the predefined function means that execution of the function corresponds to displaying a screen based on the second refresh rate, the processor 120 may maintain the refresh rate of the touch screen 160 as the second refresh rate.

In an embodiment of the disclosure, the processor 120 may control the touch screen 160 to change the refresh rate of the touch screen 160 from the second refresh rate to the first refresh rate, based on not identifying the function corresponding to the touch input. For example, the processor 120 may restore the refresh rate of the touch screen 160 to the first refresh rate, based on identifying that the touch input is a mis-input unintended by the user through a recognition of the touch input. However, it is not limited thereto.

In an embodiment of the disclosure, the processor 120 may refrain from, bypass, or defer changing the refresh rate of the touch screen 160 from the first refresh rate to the second refresh rate before identifying the function to be executed based on the touch input in response to the touch input according to a state of the electronic device 101 or a state of the environment including the electronic device 101.

For example, in case that the electronic device 101 is within a state where a difference between quality of a screen displayed based on the first refresh rate and quality of a screen displayed based on the second refresh rate is not recognized, the processor 120 may refrain from, bypass, or defer changing the refresh rate of the touch screen 160 from the first refresh rate to the second refresh rate before identifying the function in response to the touch input. For example, the processor 120 may obtain data indicating illuminance around the electronic device 101 through a sensor (e.g., the sensor module 176) of the electronic device 101, refrain from changing the refresh rate of the touch screen to the second refresh rate in response to the signal based on the data within a reference range, and change the refresh rate of the touch screen to the second refresh rate in response to the signal based on the data outside the reference range. For example, the reference range may be a parameter defined within the electronic device 101 to identify brightness around the electronic device 101 in which the difference is not recognized. For example, the reference range may be a parameter defined within the electronic device 101 to identify brightness around the electronic device 101 in which a flicker caused while displaying the screen based on the first refresh rate is not recognized. However, it is not limited thereto.

For example, in case that the electronic device 101 is within a state requiring a reduction in the amount of operations (or a reduction in power consumption) rather than quality of a screen, the processor 120 may refrain from, bypass, or defer changing the refresh rate of the touch screen 160 from the first refresh rate to the second refresh rate before identifying the function in response to the touch input. For example, the processor 120 may obtain or identify data indicating a load of the processor, refrain from changing the refresh rate of the touch screen to the second refresh rate in response to the signal based on the data within the reference range, and change the refresh rate of the touch screen to the second refresh rate in response to the signal based on the data outside the reference range. For example, the reference range may be a parameter defined to identify whether the electronic device 101 is within a state where a reduction in the amount of operations within the electronic device 101 is suitable than an enhancement of screen quality according to the use of the second refresh rate. However, it is not limited thereto.

In an embodiment of the disclosure, the processor 120 may execute changing the refresh rate of the touch screen 160 from the first refresh rate to the second refresh rate before identifying the function in response to the touch input, by using a device driver for supporting the touch screen 160. For example, changing the refresh rate of the touch screen 160 using the device driver may be exemplified through a description of FIG. 6.

Figure 6:
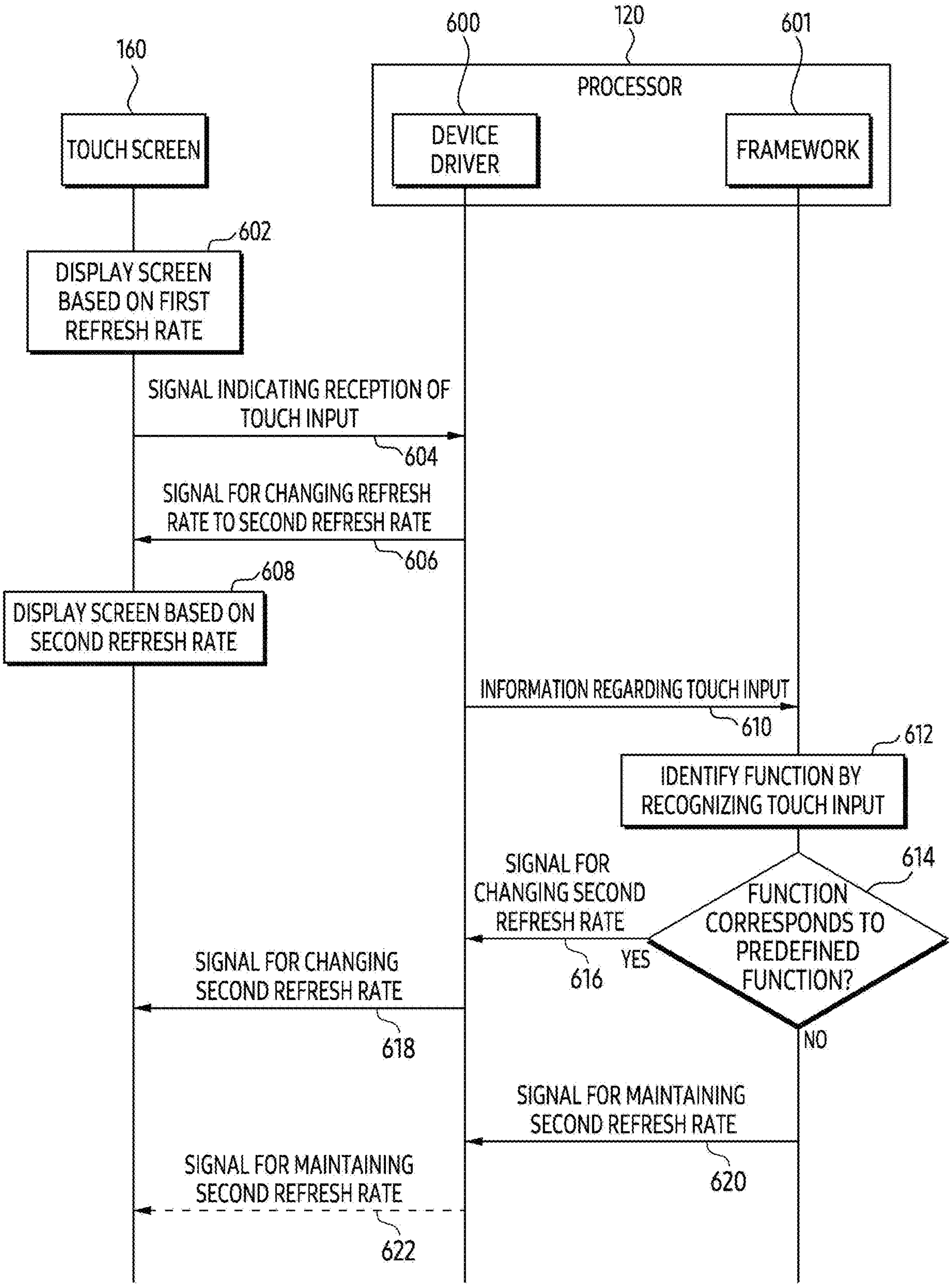
FIG. 6 illustrates a method of changing a refresh rate before recognizing a touch input using a device driver according to an embodiment of the disclosure.

FIG. 6 illustrates a method of changing a refresh rate before recognizing a touch input using a device driver according to an embodiment of the disclosure.

Referring to FIG. 6, in operation 602, the touch screen 160 may display a screen based on the first refresh rate. The touch screen 160 may receive a touch input while a screen is displayed based on the first refresh rate.

In operation 604, the touch screen 160 may provide the signal indicating the reception of the touch input to the processor 120 in response to the touch input. For example, the signal may be encoded through a firmware for the touch screen 160. For example, the processor 120 may receive the signal through a device driver 600, which is the device driver.

In operation 606, the processor 120 may provide the touch screen 160 with a signal for changing the refresh rate of the touch screen 160 to the second refresh rate in response to the reception of the signal, by using the device driver 600. For example, the signal for changing the refresh rate of the touch screen 160 to the second refresh rate may include a command for changing a period of a vertical synchronization signal of the touch screen 160. For example, the processor 120 may control the touch screen 160 to change the refresh rate of the touch screen 160 to the second refresh rate, by providing the signal for changing the refresh rate of the touch screen 160 to the second refresh rate using the device driver 600.

In operation 608, the touch screen 160 may display a screen based on the second refresh rate changed from the first refresh rate. For example, operation 608 may be executed before or while operation 610 to be exemplified below is executed. For example, operation 608 may be executed before operation 612 to be exemplified below is executed.

In operation 610, the processor 120 may provide information regarding the touch input to a framework 601, by using the device driver 600. For example, by decoding the signal received in operation 604 using the device driver 600, the processor 120 may obtain the information including data indicating a location (or coordinate) at which the touch input is received as a touch event for the touch input and provide the information to a framework 601. For example, the processor 120 may obtain the information using the framework 601.

In operation 612, the processor 120 may identify the function corresponding to the touch input by recognizing the touch input based on the information using the framework 601. For example, the processor 120 may identify the function corresponding to the touch input by decoding the information, which is the touch event, using the framework 601.

In operation 614, the processor 120 may identify whether the function corresponds to a predefined function by using the framework 601. For example, operation 614 may be included in operation 612. However, it is not limited thereto. The processor 120 may execute operation 616 using the framework 601 on a condition that the function corresponds to the predefined function, and execute operation 620 using the framework 601 on a condition that the function does not correspond to the predefined function.

In operation 616, the processor 120 may provide the device driver 600 with a signal for changing the second refresh rate using the framework 601, based on identifying that the function corresponds to the predefined function by using the framework 601. For example, the processor 120 may identify the refresh rate of the touch screen 160 to be changed from the second refresh rate using the framework 601 in response to identifying that the function corresponds to the predefined function by using the framework 601, and provide the signal for changing the second refresh rate to the identified refresh rate to the device driver 600. For example, the identified refresh rate may correspond to the function identified in operation 612. However, it is not limited thereto. For example, the device driver 600 may obtain the signal for changing the second refresh rate from the framework 601.

In operation 618, the processor 120 may provide a signal for changing the second refresh rate to the touch screen 160, by using the device driver 600. For example, the signal may be a signal for changing the second refresh rate to the first refresh rate. For example, the signal may be a signal for changing the second refresh rate to the third refresh rate. However, it is not limited thereto.

Although not illustrated in FIG. 6, based on obtaining the signal in operation 618, the touch screen 160 may display a screen based on the first refresh rate changed from the second refresh rate or the third refresh rate changed from the second refresh rate.

In operation 620, the processor 120 may provide a signal for maintaining the second refresh rate to the device driver 600 using the framework 601, based on identifying that the function is different from the predefined function by using the framework 601. For example, since the second refresh rate is changed from the first refresh rate before a recognition of the touch input is completed, the processor 120 may provide the device driver 600 with the signal for maintaining the second refresh rate using the framework 601, in order to inform the device driver 600 that a change to the second refresh rate in operation 606 corresponds to the touch input or to confirm the change to the second refresh rate in operation 606. For example, the device driver 600 may obtain the signal for maintaining the second refresh rate from the framework 601.

In operation 622, the processor 120 may provide the touch screen 160 with a signal for maintaining the second refresh rate using the device driver 600. For example, the signal may be provided to the touch screen 160 to inform that the change to the second refresh rate in operation 606 corresponds to the touch input. According to embodiments of the disclosure, operation 622 may be omitted.

Although not illustrated in FIG. 6, in an embodiment of the disclosure, when identifying whether to execute operation 606 based on data indicating illuminance around the electronic device 101, the processor 120 may provide the device driver 600 with a signal for refraining from, deferring, bypassing executing operation 606 by using the framework 601, based on identifying that the data obtained while displaying a screen through the touch screen 160 based on the first refresh rate is within a reference range. However, it is not limited thereto.

Although not illustrated in FIG. 6, in an embodiment of the disclosure, when identifying whether to execute operation 606 based on data indicating a load of the processor 120, the processor 120 may provide the device driver 600 with a signal for refraining from, deferring, bypassing executing operation 606 by using the framework 601, based on identifying that the data obtained while displaying a screen through the touch screen 160 based on the first refresh rate is within a reference range. However, it is not limited thereto.

Although not illustrated in FIG. 6, in an embodiment of the disclosure, the processor 120 may identify whether a software application providing a screen displayed based on the first refresh rate is a predetermined software application, before operation 604 is executed, by using the framework 601. For example, the predetermined software application may be a software application not requiring the change from the first refresh rate to the second refresh rate. For example, the predetermined software application may be a pre-identified software application among a plurality of software applications installed in the electronic device 101 for refraining from, deferring, or bypassing execution of operation 606. For example, the predetermined software application may be a software application providing a service based on FPS corresponding to the first refresh rate. However, it is not limited thereto. For example, the processor 120 may provide the device driver 600 with a signal for refraining from, deferring, or bypassing operation 606 by using the framework 601, in response to identifying that the software application is the predetermined software application by using the framework 601. For example, the processor 120 may provide the device driver 600 with a signal for indicating that the software application is the predetermined software application as the signal for refraining from executing operation 606 by using the framework 601, while displaying a screen provided from a software application for a camera (e.g., the camera module 180) of the electronic device 101 based on the first refresh rate. Based on the signal, the processor 120 may refrain from executing operation 606 using the device driver 600 based on a signal received from the touch screen 160 in operation 604. However, it is not limited thereto.

As described above, the electronic device 101 may execute a change to the second refresh rate in a faster response than another electronic device changing the refresh rate of the touch screen 160 based on the execution of operation 612, by changing the refresh rate of the touch screen 160 to the second refresh rate in operation 606. For example, since a touch input being received within the first state may mean that a state of the electronic device 101 is changed from the first state to the second state, which is a use state, the electronic device 101 may provide a faster response for the touch input. For example, since the electronic device 101 changes the refresh rate of the touch screen 160 to the second refresh rate faster than the other electronic device in response to the touch input, the electronic device 101 may display a more enhanced quality screen.

In an embodiment of the disclosure, the processor 120 may execute changing the refresh rate of the touch screen 160 from the first refresh rate to the second refresh rate before identifying the function in response to the touch input, by using a hardware abstraction layer (HAL). For example, the HAL may be used to interact with a hardware device, such as the touch screens 160 at a general level or abstract level rather than a detailed hardware level. For example, the HAL may be used for compatibility (or versatility) of various types of hardware devices. For example, changing the refresh rate of the touch screen 160 using the HAL may be exemplified through a description of FIG. 7.

Figure 7:
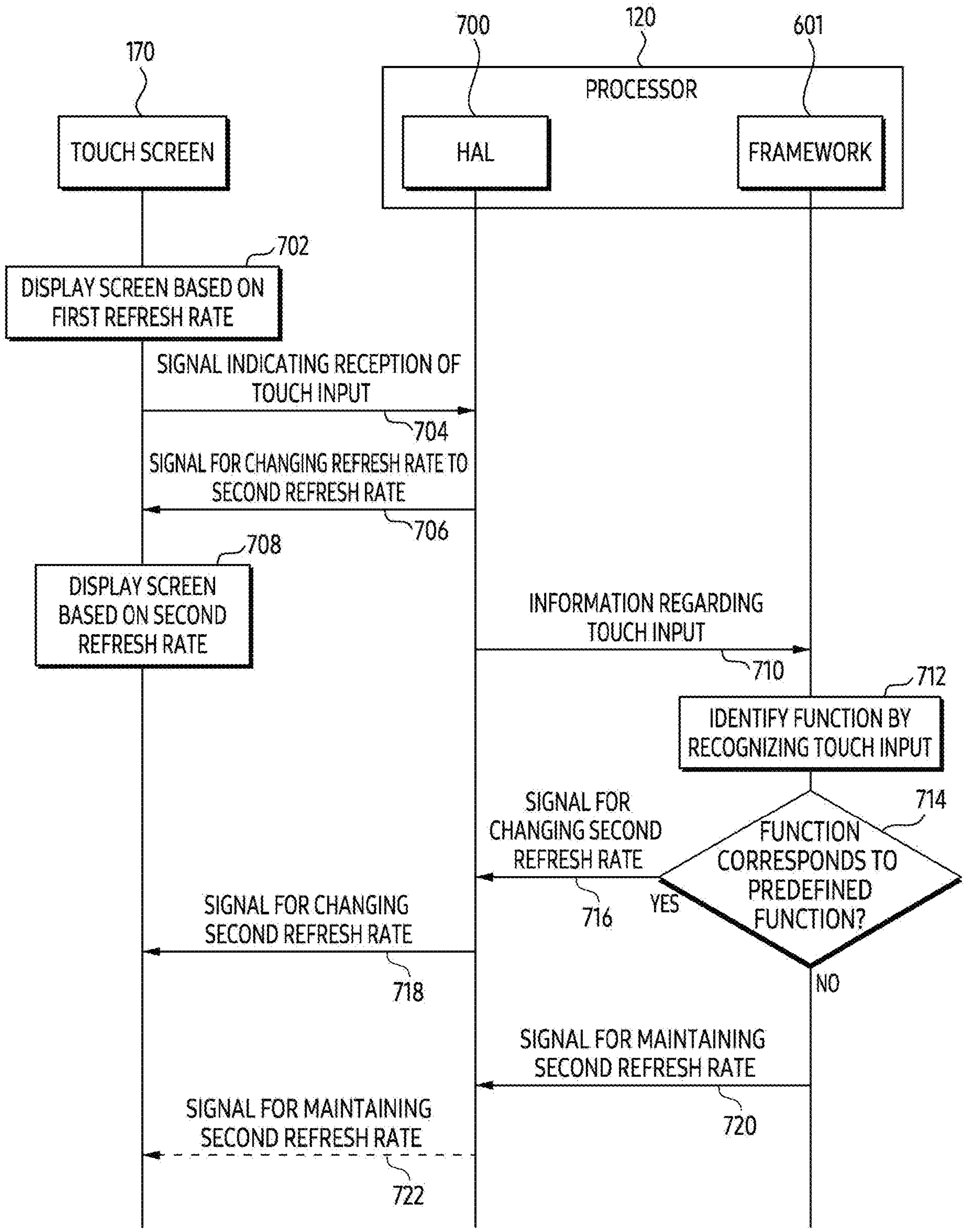
FIG. 7 illustrates a method of changing a refresh rate using a hardware abstraction layer (HAL) according to an embodiment of the disclosure.

FIG. 7 illustrates a method of changing a refresh rate using a hardware abstraction layer (HAL) according to an embodiment of the disclosure.

Referring to FIG. 7, in operation 702, a touch screen 160 may display a screen based on the first refresh rate. The touch screen 160 may receive a touch input while a screen is displayed based on the first refresh rate.

In operation 704, the touch screen 160 may provide the signal indicating the reception of the touch input to the processor 120, in response to the touch input. For example, the signal may be encoded through a firmware for the touch screen 160. Although not illustrated in FIG. 7, the signal may be provided to a HAL 700, which is the HAL, through the device driver 600. For example, the HAL 700 may receive the signal from the touch screen 160.

In operation 706, the processor 120 may provide the touch screen 160 with a signal for changing the refresh rate of the touch screen 160 to the second refresh rate, in response to the reception of the signal by using the HAL 700. Although not illustrated in FIG. 7, the signal may be provided from the HAL 700 to the touch screen 160 through the device driver 600. For example, the signal for changing the refresh rate of the touch screen 160 to the second refresh rate may include a command for changing a period of a vertical synchronization signal of the touch screen 160. For example, the processor 120 may control the touch screen 160 to change the refresh rate of the touch screen 160 to the second refresh rate, by providing the signal for changing the refresh rate of the touch screen 160 to the second refresh rate by using the HAL 700.

In operation 708, the touch screen 160 may display a screen based on the second refresh rate changed from the first refresh rate. For example, operation 708 may be executed before or while operation 710 to be exemplified below is executed. For example, operation 708 may be executed before operation 712 to be exemplified below is executed.

In operation 710, the processor 120 may provide information regarding the touch input to the framework 601 by using the HAL 700. For example, based on the signal received in operation 704 using the HAL 700, the processor 120 may obtain the information including data indicating a location (or coordinate) where the touch input is received and provide the information to the framework 601. For example, the processor 120 may obtain the information by using the framework 601.

In operation 712, the processor 120 may identify the function corresponding to the touch input by recognizing the touch input based on the information using the framework 601.

In operation 714, the processor 120 may identify whether the function corresponds to a predefined function by using the framework 601. For example, operation 714 may be included in operation 712. However, it is not limited thereto. The processor 120 may execute operation 716 using the framework 601 on a condition that the function corresponds to the predefined function, and execute operation 720 using the framework 601 on a condition that the function does not correspond to the predefined function.

In operation 716, the processor 120 may provide the HAL 700 with a signal for changing the second refresh rate using the framework 601, based on identifying that the function corresponds to the predefined function by using the framework 601. For example, the processor 120 may identify the refresh rate of the touch screen 160 to be changed from the second refresh rate using the framework 601 in response to identifying that the function corresponds to the predefined function by using the framework 601, and provide the HAL 700 with the signal for changing the second refresh rate to the identified refresh rate. For example, the identified refresh rate may correspond to the function identified in operation 712. However, it is not limited thereto. For example, the HAL 700 may obtain the signal for changing the second refresh rate from the framework 601.

In operation 718, the processor 120 may provide a signal for changing the second refresh rate to the touch screen 160, by using the HAL 700. Although not illustrated in FIG. 7, the signal may be provided from the HAL 700 to the touch screen 160 through the device driver 600. For example, the signal may be a signal for changing the second refresh rate to the first refresh rate. For example, the signal may be a signal for changing the second refresh rate to the third refresh rate. However, it is not limited thereto.

Although not illustrated in FIG. 7, based on obtaining the signal in operation 718, the touch screen 160 may display a screen based on the first refresh rate changed from the second refresh rate or the third refresh rate changed from the second refresh rate.

In operation 720, the processor 120 may provide the HAL 700 with a signal for maintaining the second refresh rate using the framework 601, based on identifying that the function is different from the predefined function using the framework 601. For example, since the second refresh rate is changed from the first refresh rate before a recognition of the touch input is completed, the processor 120 may provide the HAL 700 with the signal for maintaining the second refresh rate using the framework 601, in order to inform the HAL 700 that a change to the second refresh rate in operation 706 corresponds to the touch input or to confirm the change to the second refresh rate in operation 706.

Although not illustrated in FIG. 7, the HAL 700 may obtain the signal for maintaining the second refresh rate from the framework 601 through the device driver 600.

In operation 722, the processor 120 may provide a signal for maintaining the second refresh rate using the HAL 700 to the touch screen 160. For example, the signal may be provided to the touch screen 160, in order to inform that the change to the second refresh rate in operation 706 corresponds to the touch input. According to embodiments of the disclosure, operation 722 may be omitted.

Although not illustrated in FIG. 7, in an embodiment of the disclosure, when identifying whether to execute operation 706 based on data indicating illuminance around the electronic device 101, the processor 120 may provide the HAL 700 with a signal for refraining from, deferring, or bypassing executing operation 706 by using the framework 601, based on identifying that the data obtained while displaying a screen through the touch screen 160 based on the first refresh rate is within a reference range. However, it is not limited thereto.

Although not illustrated in FIG. 7, in an embodiment of the disclosure, when identifying whether to execute operation 706 based on data indicating a load of the processor 120, the processor 120 may provide the HAL 700 with a signal for refraining from, deferring, or bypassing executing operation 706 by using the framework 601, based on identifying that the data obtained while displaying a screen through the touch screen 160 based on the first refresh rate is within a reference range. However, it is not limited thereto.

Although not illustrated in FIG. 7, in an embodiment of the disclosure, the processor 120 may identify whether a software application providing a screen displayed based on the first refresh rate is a predetermined software application using the framework 601 before operation 704 is executed. For example, the predetermined software application may be a software application not requiring the change from the first refresh rate to the second refresh rate. For example, the predetermined software application may be a pre-identified software application among a plurality of software applications installed in the electronic device 101 for refraining from, deferring, or bypassing execution of operation 706. For example, the predetermined software application may be a software application providing a service based on FPS corresponding to the first refresh rate. However, it is not limited thereto. For example, the processor 120 may to provide the HAL 700 with a signal for refraining from, deferring, or bypassing executing operation 706 by using the framework 601, in response to identifying that the software application is the predetermined software application by using the framework 601. For example, the processor 120 may provide the HAL 700 with a signal for indicating that the software application is the predetermined software application as the signal for refraining from executing operation 706 by using the framework 601, while displaying a screen provided from a software application for a camera (e.g., the camera module 180) of the electronic device 101 based on the first refresh rate. Based on the signal, the processor 120 may refrain from executing operation 706 using the HAL 700 based on a signal received from the touch screen 160 in operation 704. However, it is not limited thereto.

As described above, by changing the refresh rate of the touch screen 160 to the second refresh rate in operation 706, the electronic device 101 may execute a change to the second refresh rate in a faster response than another electronic device changing the refresh rate of the touch screen 160 based on execution of operation 712. For example, since a touch input being received within the first state may mean that a state of the electronic device 101 is changed from the first state to the second state, which is a use state, the electronic device 101 may provide a faster response for the touch input. For example, since the electronic device 101 changes the refresh rate of the touch screen 160 to the second refresh rate faster than the other electronic device in response to the touch input, the electronic device 101 may display a more enhanced quality screen.

The above descriptions and the following descriptions illustrate operations of the processor 120 according to a touch input received while a screen is displayed based on the first refresh rate, but the touch input may be replaced with an input having a different attribute. For example, the touch input may be replaced with a pressing input on a physical button exposed through a housing of electronic device 101. For example, the physical button may be used to turn on or turn off the electronic device 101. For example, the physical button may be used to provide a secretarial service based on a speech recognition. However, it is not limited thereto.

For example, the processor 120 may receive a signal indicating a reception of the pressing input from a component of the electronic device 101 for identifying the pressing input on the physical button, while a screen is displayed based on the first refresh rate. The processor 120 may control the touch screen 160 to change the first refresh rate to the second refresh rate in response to the signal, before identifying a function to be executed based on the physical button. The processor 120 may identify the function based on a recognition of the pressing input while a screen is displayed based on the second refresh rate. The processor 120 may change the refresh rate of the touch screen 160 that is the second refresh rate, based on identifying that the function corresponds to the predefined function. The processor 120 may maintain the refresh rate of the touch screen 160 that is the second refresh rate, based on identifying that the function is different from the predefined function. However, it is not limited thereto.

Figure 8:
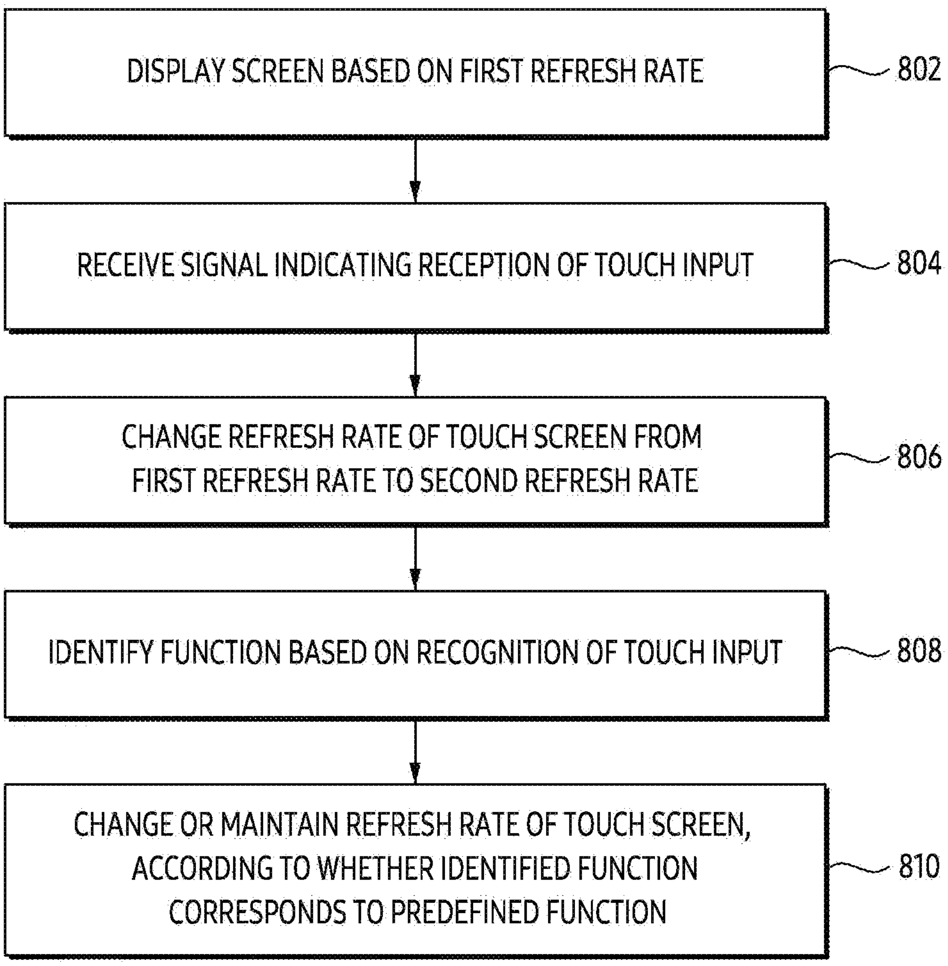
FIG. 8 is a flowchart illustrating a method of changing a refresh rate before recognizing a touch input according to an embodiment of the disclosure.

FIG. 8 is a flowchart illustrating a method of changing a refresh rate before recognizing a touch input according to an embodiment of the disclosure. This method may be executed by the electronic device 101 illustrated in FIG. 1, the processor 120 illustrated in FIG. 1, the electronic device 101 illustrated in FIG. 3, or the processor 120 illustrated in FIG. 3.

Referring to FIG. 8, in operation 802, the processor 120 may display a screen through the touch screen 160 based on the first refresh rate. For example, operation 802 may be identified based on a change from the second state to the first state. For example, operation 802 may be executed in response to identifying that an update of frame data is not executed during a reference time. For example, operation 802 may be executed in response to identifying that a touch input is not received during the reference time. For example, operation 802 may be executed in response to identifying illuminance where a flicker is not caused by a display of a screen through the first refresh rate. However, it is not limited thereto.

In operation 804, the processor 120 may receive a signal indicating a reception of a touch input from the touch screen 160 while a screen is displayed based on the first refresh rate. For example, operation 804 may be executed using the device driver 600 illustrated in FIG. 6 or the HAL 700 illustrated in FIG. 7. However, it is not limited thereto.

In operation 806, the processor 120 may change the refresh rate of the touch screen 160 from the first refresh rate to the second refresh rate in response to the touch input. For example, the processor 120 may execute operation 806, in a state that which function to be executed in response to the touch input is not identified. For example, the processor 120 may execute operation 806, in a state that a location where the touch input was received is identified but a function corresponding to the touch input is not identified. However, it is not limited thereto. For example, operation 806 may be executed using the device driver 600 or the HAL 700. However, it is not limited thereto.

Although not illustrated in FIG. 8, the processor 120 may display a screen on the touch screen 160 based on the second refresh rate, in response to execution of operation 806.

In operation 808, the processor 120 may identify a function corresponding to the touch input based on a recognition of the touch input while a screen is displayed based on the second refresh rate. For example, the processor 120 may execute operation 808 after the refresh rate of the touch screen 160 is changed to the second refresh rate.

In operation 810, the processor 120 may change or maintain the refresh rate of the touch screen 160 that is the second refresh rate, according to whether the identified function corresponds to a predefined function. For example, the processor 120 may change the refresh rate of the touch screen 160 that is the second refresh rate to another refresh rate on a condition that the identified function corresponds to the predefined function. For example, in case that the function corresponding to the predefined function is to execute a software application for a camera, the processor 120 may change the second refresh rate to a refresh rate corresponding to FPS of the camera of the electronic device 101. For example, in case that the function corresponding to the predefined function is to reproduce a video, the processor 120 may change the second refresh rate to the refresh rate corresponding to the FPS of the video. For example, the processor 120 may maintain the refresh rate of the touch screen 160 as the second refresh rate on a condition that the identified function is different from the predefined function.

In an embodiment of the disclosure, identifying whether the function corresponds to the predefined function may be executed as identifying whether the function is a function provided through a software application within a list pre-stored or pre-registered in non-volatile memory (e.g., the non-volatile memory 134 illustrated in FIG. 1) of the electronic device 101. However, it is not limited thereto.

As described above, the electronic device 101 may change the refresh rate of the touch screen 160 in operation 806 before operation 808 is executed. The electronic device 101 may identify whether a change to the second refresh rate is suitable for a state associated with the touch input through operation 810 after the refresh rate of the touch screen 160 is changed to the second refresh rate, and change or maintain the refresh rate of the touch screen 160 according to the result of the identification. For example, the electronic device 101 may enhance the quality of the screen with a fast response through operation 806 and provide a service suitable for the situation through operation 810.

Figure 9:
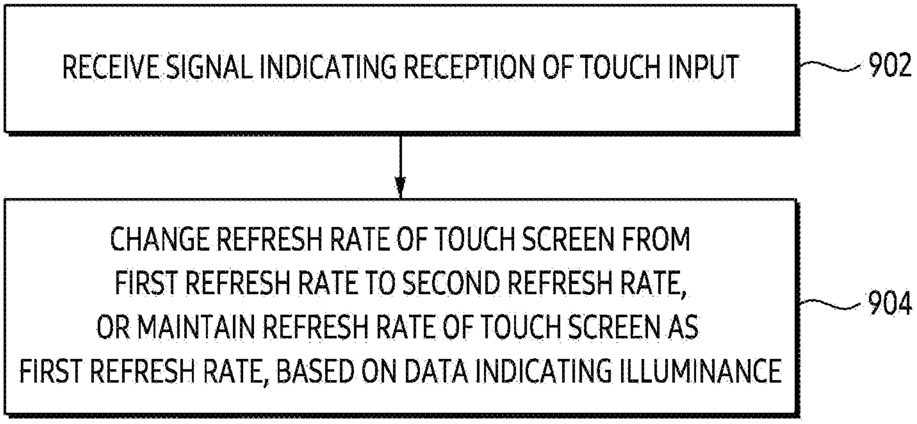
FIG. 9 is a flowchart illustrating a method of changing a refresh rate before a recognition of a touch input based on data indicating illuminance according to an embodiment of the disclosure.

FIG. 9 is a flowchart illustrating a method of changing a refresh rate before a recognition of a touch input based on data indicating illuminance according to an embodiment of the disclosure. This method may be executed by the electronic device 101 illustrated in FIG. 1, the processor 120 illustrated in FIG. 1, the electronic device 101 illustrated in FIG. 3, or the processor 120 illustrated in FIG. 3.

Referring to FIG. 9, in operation 902, the processor 120 may receive a signal indicating a reception of a touch input from the touch screen 160 while a screen is displayed based on the first refresh rate. For example, operation 902 may be included in operation 804 of FIG. 8.

In operation 904, in response to the reception of the signal, the processor 120 may change the refresh rate of the touch screen 160 from the first refresh rate to the second refresh rate, or may maintain the refresh rate of the touch screen 160 as the first refresh rate, based on data indicating illuminance of the environment around the electronic device 101.

In an embodiment of the disclosure, in case that the data is periodically obtained through an illuminance sensor of the electronic device 101, the processor 120 may change or maintain the refresh rate of the touch screen 160 based on the data most recently obtained through the illuminance sensor from a timing of receiving the signal. However, it is not limited thereto.

For example, the processor 120 may maintain the refresh rate of the touch screen 160, on a condition that the data indicates that a flicker is not caused by displaying a screen in the first refresh rate. For example, the processor 120 may change the refresh rate of the touch screen 160 to the second refresh rate, on a condition that the data indicates that a flicker is caused by displaying a screen in the first refresh rate.

As described above, the electronic device 101 may change the refresh rate of the touch screen 160 from the first refresh rate to the second refresh rate when the electronic device 101 is located in an environment capable of recognizing a difference between the first refresh rate and the second refresh rate, and maintain the refresh rate of the touch screen 160 as the first refresh rate when the electronic device 101 is located in an environment incapable of recognizing the difference. The electronic device 101 may provide a service corresponding to an environment in which the electronic device 101 is located, through these operations.

Figure 10:
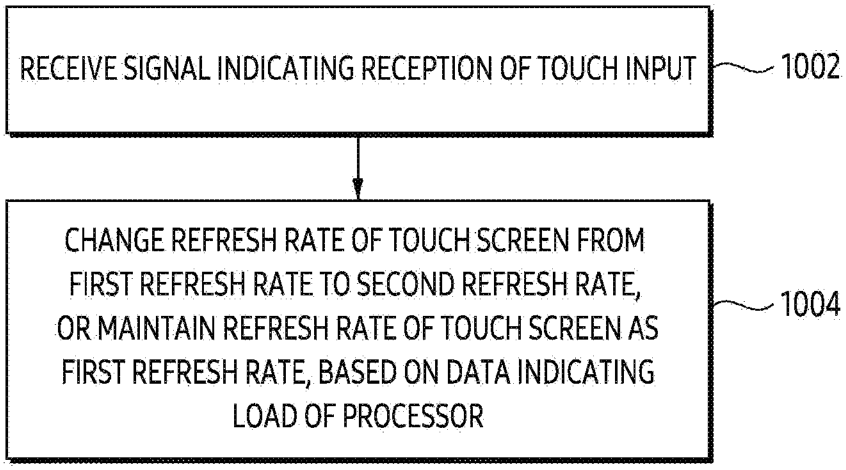
FIG. 10 is a flowchart illustrating a method of changing a refresh rate before a recognition of a touch input based on data indicating a load of a processor according to an embodiment of the disclosure.

FIG. 10 is a flowchart illustrating a method of changing a refresh rate before a recognition of a touch input based on data indicating a load of a processor according to an embodiment of the disclosure. This method may be executed by the electronic device 101 illustrated in FIG. 1, the processor 120 illustrated in FIG. 1, the electronic device 101 illustrated in FIG. 3, or the processor 120 illustrated in FIG. 3.

Referring to FIG. 10, in operation 1002, the processor 120 may receive a signal indicating a reception of a touch input from the touch screen 160, while a screen is displayed based on the first refresh rate. For example, operation 1002 may be included in operation 804 of FIG. 8.

In operation 1004, in response to the reception of the signal, the processor 120 may change the refresh rate of the touch screen 160 from the first refresh rate to the second refresh rate, or maintain the refresh rate of the touch screen 160 as the first refresh rate, based on data indicating a load of the processor 120.

In an embodiment of the disclosure, the data may be periodically identified while a screen is displayed based on the first refresh rate. For example, the processor 120 may change or maintain the refresh rate of the touch screen 160 based on the data most recently identified from a timing of receiving the signal. However, it is not limited thereto.

For example, the processor 120 may maintain the refresh rate of the touch screen 160, on a condition that the data indicates a state in which overload of the processor 120 may occur according to the change to the second refresh rate. For example, the processor 120 may change the refresh rate of the touch screen 160 to the second refresh rate, on a condition that the data indicates a state in which the overload of the processor 120 does not occur according to the change to the second refresh rate.

As described above, the electronic device 101 may change the refresh rate of the touch screen 160 from the first refresh rate to the second refresh rate when the electronic device 101 is in a state in which quality of the screen is prioritized over improvement of a load of the processor 120, and maintain the refresh rate of the touch screen 160 as the first refresh rate when the electronic device 101 is in a state in which the improvement of the load of the processor 120 is prioritized over the quality of the screen.

The electronic device and the method according to an embodiment may increase resource efficiency associated with the change of the refresh rate by changing a refresh rate of a touch screen in response to a touch input before identifying a function to be executed based on the touch input.

As described above, according to an embodiment of the disclosure, an electronic device (e.g., the electronic device 101) may include a touch screen (e.g., the touch screen 160) and a processor (e.g., the processor 120). The processor may be configured to display a screen based on a first refresh rate through the touch screen. The processor may be configured to, while displaying the screen based on the first refresh rate, receive a signal indicating a reception of a touch input from the touch screen. The processor may be configured to, before identifying a function to be executed based on the touch input, in response to the signal, control the touch screen to change a refresh rate of the touch screen from the first refresh rate to a second refresh rate higher than the first refresh rate. The processor may be configured to, while the screen is displayed based on the second refresh rate, identify the function based on a recognition of the touch input. The processor may be configured to control the touch screen to change the refresh rate of the touch screen that is the second refresh rate, based on identifying the function corresponding to a predefined function. The processor may be configured to control the touch screen to maintain the refresh rate of the touch screen that is the second refresh rate, based on identifying the function different from the predefined function.

In an embodiment of the disclosure, the function corresponding to the predefined function may be a function associated with a software application providing a service based on a frame per second (FPS) not corresponding to the second refresh rate.

In an embodiment of the disclosure, the function corresponding to the predefined function may be a function associated with a software application pre-registered to display a screen based on a refresh rate different from the second refresh rate, among a plurality of software applications installed in the electronic device.

In an embodiment of the disclosure, the processor may be configured to receive, using a device driver (e.g., the device driver 600) for supporting the touch screen, the signal. In an embodiment of the disclosure, the processor may be configured to control the touch screen to change the refresh rate of the touch screen to the second refresh rate, by providing to the touch screen, using the device driver, a signal for changing the refresh rate of the touch screen to the second refresh rate in response to the signal.

In an embodiment of the disclosure, the processor may be configured to, in response to the signal for indicating the reception of the touch input, provide, to a framework (e.g., the framework 601), using the device driver, information regarding the touch input.

In an embodiment of the disclosure, the processor may be configured to, while displaying a screen based on the second refresh rate, identify the function by recognizing the touch input based on the information using the framework.

In an embodiment of the disclosure, the processor may be configured to, based on identifying the function corresponding to the predefined function, provide a signal for changing the refresh rate of the touch screen from the second refresh rate to the first refresh rate, or a signal for changing the refresh rate of the touch screen from the second refresh rate to a third refresh rate different from the first refresh rate and the second refresh rate, using the framework, to the device driver. In an embodiment of the disclosure, the processor may be configured to, based on providing, using the device driver, to the touch screen, the signal for changing the refresh rate of the touch screen from the second refresh rate to the first refresh rate, or the signal for changing the refresh rate of the touch screen from the second refresh rate to the third refresh rate, control the touch screen to change the refresh rate of the touch screen to the first refresh rate or the third refresh rate.

In an embodiment of the disclosure, the processor may be configured to, based on identifying the function different from the predefined function, provide a signal for maintaining the refresh rate of the touch screen as the second refresh rate, to the device driver, using the framework.

In an embodiment of the disclosure, the processor may be further configured to, in response to receiving the signal for indicating the reception of the touch input using the device driver, identify, using the device driver, whether the signal for changing the refresh rate of the touch screen from the second refresh rate to the first refresh rate, the signal for changing the refresh rate of the touch screen from the second refresh rate to the third refresh rate, or the signal for maintaining the refresh rate of the touch screen as the second refresh rate is obtained during a reference time from a timing receiving the signal for indicating the reception of the touch input, from the framework. In an embodiment of the disclosure, the processor may be further configured to, based on identifying that the signal for changing the refresh rate of the touch screen from the second refresh rate to the first refresh rate, the signal for changing the refresh rate of the touch screen from the second refresh rate to the third refresh rate, and the signal for maintaining the refresh rate of the touch screen as the second refresh rate are not obtained during the reference time from the timing, control the touch screen to change the refresh rate of the touch screen to the first refresh rate, by providing to the touch screen, using the device driver, a signal for changing the refresh rate of the touch screen from the second refresh rate to the first refresh rate.

In an embodiment of the disclosure, the processor may be configured to receive, using a hardware abstraction layer (HAL) (e.g., the HAL 700), through the device driver (e.g., the device driver 600) for supporting the touch screen, the signal. In an embodiment of the disclosure, the processor may be configured to control the touch screen to change the refresh rate of the touch screen to the second refresh rate, by providing to the touch screen through the device driver using the HAL a signal for changing the refresh rate of the touch screen to the second refresh rate in response to the signal.

In an embodiment of the disclosure, the processor may be configured to, in response to the signal for indicating the reception of the touch input, provide, to a framework (e.g., the framework 601), using the HAL, information regarding the touch input. In an embodiment of the disclosure, the processor may be configured to, while displaying a screen based on the second refresh rate, identify the function by recognizing the touch input based on the information using the framework.

In an embodiment of the disclosure, the processor may be configured to, based on identifying the function corresponding to the predefined function, provide, to the HAL, a signal for changing the refresh rate of the touch screen from the second refresh rate to the first refresh rate, or a signal for changing the refresh rate of the touch screen from the second refresh rate to a third refresh rate different from the first refresh rate and the second refresh rate, using the framework. In an embodiment of the disclosure, the processor may be configured to, based on providing, to the touch screen, through the device driver, using the HAL, a signal for changing the refresh rate of the touch screen from the second refresh rate to the first refresh rate, or a signal for changing the refresh rate of the touch screen from the second refresh rate to the third refresh rate, control the touch screen to change the refresh rate of the touch screen to the first refresh rate or the third refresh rate.

In an embodiment of the disclosure, the processor may be configured to, based on identifying the function different from the predefined function, provide a signal for maintaining the refresh rate of the touch screen as the second refresh rate, to the HAL, using the framework.

In an embodiment of the disclosure, the processor may be further configured to, in response to receiving, using the HAL, the signal for indicating the reception of the touch input, identify, using the HAL, whether the signal for changing the refresh rate of the touch screen from the second refresh rate to the first refresh rate, the signal for changing the refresh rate of the touch screen from the second refresh rate to the third refresh rate, or the signal for maintaining the refresh rate of the touch screen as the second refresh rate is obtained during a reference time from a timing receiving the signal for indicating the reception of the touch input, from the framework. In an embodiment of the disclosure, the processor may be further configured to, based on identifying that the signal for changing the refresh rate of the touch screen from the second refresh rate to the first refresh rate, the signal for changing the refresh rate of the touch screen from the second refresh rate to the third refresh rate, and the signal for maintaining the refresh rate of the touch screen as the second refresh rate are not obtained during the reference time from the timing, control the touch screen to change the refresh rate of the touch screen to the first refresh rate, by providing to the touch screen using the HAL a signal for changing the refresh rate of the touch screen from the second refresh rate to the first refresh rate through the device driver.

In an embodiment of the disclosure, the processor may be configured to, in response to identifying that frame data is not provided to the touch screen during a reference time, change the refresh rate of the touch screen from the second refresh rate to the first refresh rate. In an embodiment of the disclosure, the processor may be configured to display, through the touch screen, a screen based on the first refresh rate. In an embodiment of the disclosure, the processor may be configured to, while displaying a screen based on the first refresh rate, receive the signal indicating the reception of the touch input from the touch screen.

In an embodiment of the disclosure, the processor may be configured to, in response to identifying that a touch input is not received during a reference time, change the refresh rate of the touch screen from the second refresh rate to the first refresh rate. In an embodiment of the disclosure, the processor may be configured to display, through the touch screen, a screen based on the first refresh rate. In an embodiment of the disclosure, the processor may be configured to, while displaying a screen based on the first refresh rate, receive the signal indicating the reception of the touch input from the touch screen.

In an embodiment of the disclosure, the processor may be configured to obtain data indicating illuminance around the electronic device. In an embodiment of the disclosure, the processor may be configured to refrain from changing the refresh rate of the touch screen to the second refresh rate in response to the signal, before identifying the function to be executed based on the touch input, based on the data within a reference range. In an embodiment of the disclosure, the processor may be configured to control the touch screen to change the refresh rate of the touch screen from the first refresh rate to the second refresh rate in response to the signal, before identifying the function to be executed based on the touch input, based on the data outside of the reference range.

In an embodiment of the disclosure, the processor may be configured to obtain data indicating a load of the processor. In an embodiment of the disclosure, the processor may be configured to refrain from changing the refresh rate of the touch screen to the second refresh rate in response to the signal, before identifying the function to be executed based on the touch input, based on the data within a reference range. In an embodiment of the disclosure, the processor may be configured to control the touch screen to change the refresh rate of the touch screen from the first refresh rate to the second refresh rate in response to the signal, before identifying the function to be executed based on the touch input, based on the data outside of the reference range.

A method for operating an electronic device (e.g., the electronic device 101) including a touch screen (e.g., the touch screen 160) may comprise displaying a screen based on a first refresh rate through the touch screen (e.g., operation 802). The method may comprise, while displaying the screen based on the first refresh rate, receiving a signal indicating a reception of a touch input from the touch screen (e.g., operation 804). The method may comprise, before identifying a function to be executed based on the touch input, in response to the signal, controlling the touch screen to change a refresh rate of the touch screen from the first refresh rate to a second refresh rate higher than the first refresh rate (e.g., operation 806). The method may comprise, while the screen is displayed based on the second refresh rate, identifying the function based on a recognition of the touch input (e.g., operation 808). The method may comprise, based on identifying the function corresponding to a predefined function, controlling the touch screen to change the refresh rate of the touch screen that is the second refresh rate (e.g., operation 810). The method may comprise, based on identifying the function different from the predefined function, controlling the touch screen to maintain the refresh rate of the touch screen that is the second refresh rate (e.g., operation 810).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase “means for” or “means.”

What is claimed is:

1. An electronic device comprising:

a touch-sensitive display;

at least one processor comprising processing circuitry; and memory comprising one or more storage media storing instructions, wherein the instructions, when executed by the at least one processor individually or collectively, cause the at least one processor to:

control the touch-sensitive display in accordance with a first refresh rate;

while the touch-sensitive display is controlled in accordance with the first refresh rate, receive, from the touch-sensitive display, a first signal to indicate a reception of touch input on the touch-sensitive display, wherein the first signal is received using a hardware abstraction layer (HAL) executed by the at least one processor;

in response to receiving the first signal, execute the HAL to control the touch-sensitive display to change from the first refresh rate to a second refresh rate higher than the first refresh rate, wherein:

the HAL executed by the at least one processor is configured to:

in response to receiving the first signal, transmit, to the touch-sensitive display, a second signal for changing from the first refresh rate to the second refresh rate, based on the first signal, obtain information including data indicating a position in which the touch input is received, and transmit, to a framework executed by the at least one processor, the information including the data, and the transmission of the second signal is performed by the HAL before the touch input is recognized by the framework in accordance with the information including the data;

while the touch-sensitive display is controlled in accordance with the second refresh rate:

execute the framework to recognize the touch input in accordance with the information including the data, and execute the framework to identify whether a function to be executed in accordance with the touch input corresponds to a defined function;

based on the function being identified as corresponding to the defined function, execute the HAL to control the touch-sensitive display to change from the second refresh rate to the first refresh rate or a third refresh rate different from the first and second refresh rates; and based on the function being identified as not corresponding to the defined function, maintain the second refresh rate, wherein the changing from the second refresh rate to the first or third refresh rate and the maintaining of the second refresh rate are triggered by the framework, and wherein the changing from the first refresh rate to the second refresh rate is triggered by the HAL.

2. The electronic device of claim 1, wherein the defined function is associated with a software application providing a service based on frames per second (FPS) not corresponding to the second refresh rate.

3. The electronic device of claim 1, wherein the defined function is associated with a software application pre-registered as using a fourth refresh rate different from the second refresh rate, among a plurality of software application installed in the electronic device.

4. The electronic device of claim 1, wherein the HAL is configured to obtain the information by decoding the first signal.

5. The electronic device of claim 1, wherein the HAL is configured to:

based on the function being identified as corresponding to the defined function, transmit, to the touch-sensitive display, a third signal for changing from the second refresh rate to the first refresh rate or a fourth signal for changing from the second refresh rate to the third refresh rate, wherein the transmission of the third signal and the transmission of the fourth signal are performed in accordance with a trigger of the framework.

6. The electronic device of claim 5, wherein the HAL is configured to:

based on the function being identified as not corresponding to the defined function, transmit, to the touch-sensitive display, a fifth signal for maintaining the second refresh rate.

7. The electronic device of claim 6, wherein the HAL is configured to:

in response to receiving the first signal, run a timer;

based on the trigger of the framework being informed to the HAL before the timer is expired, transmit, to the touch-sensitive display, a signal corresponding to the trigger of the framework from among the third signal, the fourth signal, or the fifth signal; and based on the trigger of the framework being not informed to the HAL until the timer is expired, transmit, to the touch-sensitive display, the third signal.

8. The electronic device of claim 1, wherein the instructions, when executed by the at least one processor individually or collectively, cause the electronic device to:

obtain ambient brightness data;

based on the ambient brightness data being identified within a reference range, refrain from executing the HAL to control the touch-sensitive display to change from the first refresh rate to the second refresh rate in response to receiving the first signal; and based on the ambient brightness data being identified out of the reference range, execute the HAL to control the touch-sensitive display to change from the first refresh rate to the second refresh rate in response to receiving the first signal.

9. A method executed by at least one processor of an electronic device with a touch-sensitive display, the method comprising:

controlling the touch-sensitive display in accordance with a first refresh rate;

while the touch-sensitive display is controlled in accordance with the first refresh rate, receiving, from the touch-sensitive display, a first signal to indicate a reception of touch input on the touch-sensitive display, wherein the first signal is received using a hardware abstraction layer (HAL) executed by the at least one processor;

in response to receiving the first signal, executing the HAL to control the touch-sensitive display to change from the first refresh rate to a second refresh rate higher than the first refresh rate, wherein:

the HAL executed by the at least one processor is configured to:

in response to receiving the first signal, transmit, to the touch-sensitive display, a second signal for changing from the first refresh rate to the second refresh rate, based on the first signal, obtain information including data indicating a position in which the touch input is received, and transmit, to a framework executed by the at least one processor, the information including the data, and the transmission of the second signal is performed by the HAL before the touch input is recognized by the framework in accordance with the information including the data;

while the touch-sensitive display is controlled in accordance with the second refresh rate:

executing the framework to recognize the touch input in accordance with the information including the data, and executing the framework to identify whether a function to be executed in accordance with the touch input corresponds to a defined function;

based on the function being identified as corresponding to the defined function, executing the HAL to control the touch-sensitive display to change from the second refresh rate to the first refresh rate or a third refresh rate different from the first and second refresh rates; and based on the function being identified as not corresponding to the defined function, maintaining the second refresh rate, wherein the changing from the second refresh rate to the first or third refresh rate and the maintaining of the second refresh rate are triggered by the framework, and wherein the changing from the first refresh rate to the second refresh rate is triggered by the HAL.

10. The method of claim 9, wherein the defined function is associated with a software application providing a service based on frames per second (FPS) not corresponding to the second refresh rate.

11. The method of claim 9, wherein the defined function is associated with a software application pre-registered as using a fourth refresh rate different from the second refresh rate, among a plurality of software application installed in the electronic device.

12. The method of claim 9, wherein the HAL is configured to obtain the information by decoding the first signal.

13. The method of claim 9, wherein the HAL is configured to:

based on the function being identified as corresponding to the defined function, transmit, to the touch-sensitive display, a third signal for changing from the second refresh rate to the first refresh rate or a fourth signal for changing from the second refresh rate to the third refresh rate, wherein the transmission of the third signal and the transmission of the fourth signal are performed in accordance with a trigger of the framework.

14. The method of claim 13, wherein the HAL is configured to:

based on the function being identified as not corresponding to the defined function, transmit, to the touch-sensitive display, a fifth signal for maintaining the second refresh rate.

15. The method of claim 14, wherein the HAL is configured to:

in response to receiving the first signal, run a timer;

based on the trigger of the framework being informed to the HAL before the timer is expired, transmit, to the touch-sensitive display, a signal corresponding to the trigger of the framework from among the third signal, the fourth signal, or the fifth signal; and based on the trigger of the framework being not informed to the HAL until the timer is expired, transmit, to the touch-sensitive display, the third signal.

16. The method of claim 9, comprising:

obtaining ambient brightness data;

based on the ambient brightness data being identified within a reference range, refraining from executing the HAL to control the touch-sensitive display to change from the first refresh rate to the second refresh rate in response to receiving the first signal; and based on the ambient brightness data being identified out of the reference range, executing the HAL to control the touch-sensitive display to change from the first refresh rate to the second refresh rate in response to receiving the first signal.

17. A non-transitory computer readable storage medium storing one or more programs, the one or more programs comprising instructions, when executed by at least one processor of an electronic device with a touch-sensitive display, to cause the at least one processor to:

control the touch-sensitive display in accordance with a first refresh rate;

while the touch-sensitive display is controlled in accordance with the first refresh rate, receive, from the touch-sensitive display, a first signal to indicate a reception of touch input on the touch-sensitive display, wherein the first signal is received using a hardware abstraction layer (HAL) executed by the at least one processor;

in response to receiving the first signal, execute the HAL to control the touch-sensitive display to change from the first refresh rate to a second refresh rate higher than the first refresh rate, wherein:

the HAL executed by the at least one processor is configured to:

in response to receiving the first signal, transmit, to the touch-sensitive display, a second signal for changing from the first refresh rate to the second refresh rate, based on the first signal, obtain information including data indicating a position in which the touch input is received, and transmit, to a framework executed by the at least one processor, the information including the data, and the transmission of the second signal is performed by the HAL before the touch input is recognized by the framework in accordance with the information including the data;

while the touch-sensitive display is controlled in accordance with the second refresh rate:

execute the framework to recognize the touch input in accordance with the information including the data, and execute the framework to identify whether a function to be executed in accordance with the touch input corresponds to a defined function;

based on the function being identified as corresponding to the defined function, execute the HAL to control the touch-sensitive display to change from the second refresh rate to the first refresh rate or a third refresh rate different from the first and second refresh rates; and based on the function being identified as not corresponding to the defined function, maintain the second refresh rate, wherein the changing from the second refresh rate to the first or third refresh rate and the maintaining of the second refresh rate are triggered by the framework, and wherein the changing from the first refresh rate to the second refresh rate is triggered by the HAL.

18. The non-transitory computer readable storage medium of claim 17, wherein the HAL is configured to obtain the information by decoding the first signal.

19. The non-transitory computer readable storage medium of claim 17, wherein the HAL is configured to:

based on the function being identified as corresponding to the defined function, transmit, to the touch-sensitive display, a third signal for changing from the second refresh rate to the first refresh rate or a fourth signal for changing from the second refresh rate to the third refresh rate, wherein the transmission of the third signal and the transmission of the fourth signal are performed in accordance with a trigger of the framework;

based on the function being identified as not corresponding to the defined function, transmit, to the touch-sensitive display, a fifth signal for maintaining the second refresh rate;

in response to receiving the first signal, run a timer;

based on the trigger of the framework being informed to the HAL before the timer is expired, transmit, to the touch-sensitive display, a signal corresponding to the trigger of the framework from among the third signal, the fourth signal, or the fifth signal; and based on the trigger of the framework being not informed to the HAL until the timer is expired, transmit, to the touch-sensitive display, the third signal.

20. The non-transitory computer readable storage medium of claim 17, wherein the one or more programs comprises instructions, when executed by the at least one processor, to cause the at least one processor to:

obtain ambient brightness data;

based on the ambient brightness data being identified within a reference range, refrain from executing the HAL to control the touch-sensitive display to change from the first refresh rate to the second refresh rate in response to receiving the first signal; and based on the ambient brightness data being identified out of the reference range, execute the HAL to control the touch-sensitive display to change from the first refresh rate to the second refresh rate in response to receiving the first signal.

* * * * *